United States Patent [19]
Kline

[11] 4,207,811
[45] Jun. 17, 1980

[54] DEWATERING PRESS

[75] Inventor: Donald C. Kline, Allentown, Pa.

[73] Assignee: Lehampton Farms, Inc., Macungie, Pa.

[21] Appl. No.: 933,850

[22] Filed: Aug. 15, 1978

Related U.S. Application Data

[62] Division of Ser. No. 713,349, Aug. 11, 1976, Pat. No. 4,109,448.

[51] Int. Cl.$^2$ ................................................. B30B 9/20
[52] U.S. Cl. .................................. 100/121; 100/158 C
[58] Field of Search ..................... 100/116, 121, 158 C

[56] References Cited

U.S. PATENT DOCUMENTS

| | | | |
|---|---|---|---|
| 1,040,842 | 10/1912 | Anderson | 100/158 C |
| 2,146,158 | 2/1939 | Scherer | 100/158 C |
| 2,356,122 | 8/1944 | Edwards | 100/158 C |
| 2,793,583 | 5/1957 | Messing | 100/121 X |
| 2,945,431 | 7/1960 | Wehr | 100/158 C X |
| 3,105,434 | 10/1963 | Messing | 100/158 C |
| 3,204,551 | 9/1965 | Messing | 100/158 C |
| 3,447,450 | 6/1969 | Wilhelm | 100/116 |

*Primary Examiner*—John M. Jillions
*Attorney, Agent, or Firm*—Stanley B. Kita

[57] ABSTRACT

A dewatering press which is particularly suited for use on a self-propelled vehicle designed to field process alfalfa for obtaining therefrom fiber and protein components and a deproteinized liquid component which is simultaneously applied on the field as the vehicle advances. The dewatering press includes a pair of conical pressure members mounted in a frame assembly which provides outward and downward pivotal movement of the conical members to afford access to the interior of the press. Material to be pressed is charged downwardly between the pressure members as they are rotated slowly by motors mounted in the frame assembly, and after having passed through a pressing zone located below the rotational axis of the conical members, the pressed material is discharged outwardly by a deflector mounted between the conical members. Expressed juices are collected in a pan which extends along the lower periphery of the pressure members.

6 Claims, 6 Drawing Figures

DEWATERING PRESS

This is a divisional, of application Ser. No. 713,349, now U.S. Pat. No. 4,109,448, filed Aug. 11, 1976.

FIELD OF THE INVENTION

The disclosure of U.S. Pat. No. 4,109,448 issued on Aug. 29, 1978, to the same inventor is incorporated by reference herein.

The present invention relates to a method and apparatus for field-processing vegetation. More particularly, the present invention relates to methods and apparatus for field-processing green-plant vegetation to obtain plant protein and fiber and a deproteinized liquid which is simultaneously discarded on the field.

BACKGROUND OF THE INVENTION

Dehydrated alfalfa is used as a supplement in livestock feed. The dehydrated alfalfa is customarily obtained by a process which involves harvesting alfalfa, hauling the harvested alfalfa to a centrally-located processing plant, heating the alfalfa at the plant to evaporate moisture therefrom, and then pelletizing the alfalfa. The alfalfa is usually dehydrated in rotary kilns which are heated by the combustion of fossil fuels such as oil or natural gas. A significant amount of thermal energy is required to dehydrate the alfalfa in this manner. Hence, with increasing constraints on the supply of fossil fuels, it should be apparent that the cost to produce dehydrated alfalfa by this process will continue to bear a direct relation to the cost of fuel.

Conventionally, alfalfa to be dehydrated is harvested by a self-propelled vehicle which cuts the alfalfa and collects the same in a hopper carried on the vehicle or in a trailer towed behind the vehicle. Although this procedure has the advantage of minimizing mechanical handling of the alfalfa in the field, it requires a substantial amount of energy simply to haul the relatively heavy, moisture-laden alfalfa to the processing plant. Also, the restrictions on the physical size of vehicles which can be used to haul alfalfa on the roads makes it desirable for the alfalfa to be compacted as much as possible for hauling in order to minimize the number of trips required to transport a given weight of alfalfa from the field to the processing plant.

The amount of moisture in the alfalfa can be reduced by sun-drying or field-wilting techniques. These techniques involve cutting the alfalfa, tedding the alfalfa, and gathering the alfalfa after it has dried to the desired moisture level. Although this procedure utilizes free solar energy to evaporate moisture from the alfalfa, solar energy does not provide a reliable source of heat because of the vagaries of the weather. Moreover, this technique is also less efficient since it involves greater mechanical handling of the alfalfa and hence more labor than the conventional procedure.

It is known that mechanical handling of dried alfalfa can cause substantial field losses of valuable plant matter. For instance, as the alfalfa dries, its leaves become brittle. Brittle leaves are easily shattered by mechanical manipulation. As much as 10-20% of the alfalfa plant may be lost from mechanical handling. Also, 5-10% of the dry plant matter can be lost by respiration after cutting. Since the leaves are an important part of the alfalfa plant containing the most protein and the least fiber, it should be apparent that these losses should be avoided where possible.

In addition to the losses due to mechanical handling, sun-drying of alfalfa is known to cause a deterioration in the carotene and xanthophyll content of the alfalfa. These components, together with protein, are normally guaranteed in the analysis of dehydrated alfalfa. Accordingly, it should be apparent that a process whereby a high-quality dehydrated alfalfa product can be produced efficiently is highly desirable.

In recent years, some experimental work has been conducted to demonstrate the practicality of processes for extracting protein concentrates from the alfalfa plant. In these processes, harvested alfalfa is transported to a processing plant where the alfalfa is macerated and pressed to separate the alfalfa into a fibrous fraction and a liquid fraction. The fibrous fraction is retained and dehydrated or used as ensilage, etc. The liquid fraction is heated to a predetermined temperature to cause the plant protein contained therein to coagulate and form a cheeselike curd which floats on a whey or brown juice. The curd is rich in protein, low in fiber content, and high in xanthophyll and carotene. The curd is, therefore, economically valuable as a feed supplement for non-ruminant animals, and especially poultry. For a more detailed description of the above proceses, reference is made to the following articles: *Crops and Soils Magazine*, August–September, 1973, pages 12–13; *Report of Fifth Annual Alfalfa Symposium* held on Apr. 8, 1975, in Hershey, Pa.; *Technical and Ergonomic Aspects of the Production of Alfalfa Silage by Fractionation*, paper given at the Eighth International Congress of Agricultural Engineering held in The Netherlands on Sept. 23–29, 1974, by Bouhn, Koegel, Schirer, and Fromin; and a Report entitled *On the Farm Production of Alfalfa Juice Protein* by Bouhn and Koegel presented at the American Society of Agricultural Engineers Plant Juice Seminar at Madison, Wisconsin on Apr. 27, 1974.

Although the processes described in the above articles are capable of extracting valuable components from alfalfa, they have several limitations. For instance, the processes are performed at a stationary plant location. Thus, the alfalfa (and the water contained therein) must be hauled to the plant, and this involves the expenditure of substantial amounts of labor and energy. In addition, these processes generate substantial quantities of deproteinized brown juice or whey which must be discarded in an environmentally-satisfactory manner.

OBJECTS OF THE INVENTION

With the foregoing in mind, it is a primary object of the present invention to provide a novel method and apparatus for enabling high-quality dehydrated alfalfa and alfalfa silage to be produced efficiently.

Another object of the present invention is to provide an improved method and apparatus for producing dehydrated alfalfa which is rich in carotene and xanthophyll.

A further object of the present invention is to provide a method and apparatus for enabling high quality dehydrated alfalfa to be produced substantially independent of weather conditions.

It is another object of the present invention to provide a unique method and apparatus for field-processing alfalfa to obtain a fibrous fraction and a liquid fraction having a protein component which is retained and a deproteinized liquid component which is applied onto the field during processing.

A still further object of the present invention is to provide alfalfa-processing apparatus which is sufficiently compact and light in weight as to be capable of being carried on a self-propelled vehicle.

As a still further object, the present invention provides an improved dewatering press which is light in weight, compact and which is capable of expressing a maximum amount of liquid from green plant vegetation such as alfalfa or other legumes.

The present invention provides an improved dewatering press for separating the macerated alfalfa into fibrous and liquid fractions. The dewatering press comprises a pair of conical pressure members, means mounting the pressure members for rotation about obtusely-intersecting horizontal axes, means to rotate the pressure members, deflector vane means disposed between the pressure members operable to expel alfalfa fiber from between the press members as they rotate, and pan means extending around the lower periphery of the pressure members to collect liquid expressed from the alfalfa. The pressure member mounting means includes a pair of upstanding strut assemblies located outboard of the pressure members, bearing means mounted between each strut assembly and each pressure member, hinge means pivotally connecting the bottoms of the strut assemblies to a base to afford downward pivotal movement of the pressure members away from one another, and tie bar means extending across the tops of the pressure members for releasably connecting the strut assemblies together. Screen means and channel means are provided on the confronting surfaces of the pressure members to enhance the pressing action.

These and other objects, features and advantages of the present invention should become apparent from the following description and drawings.

Figure 1:
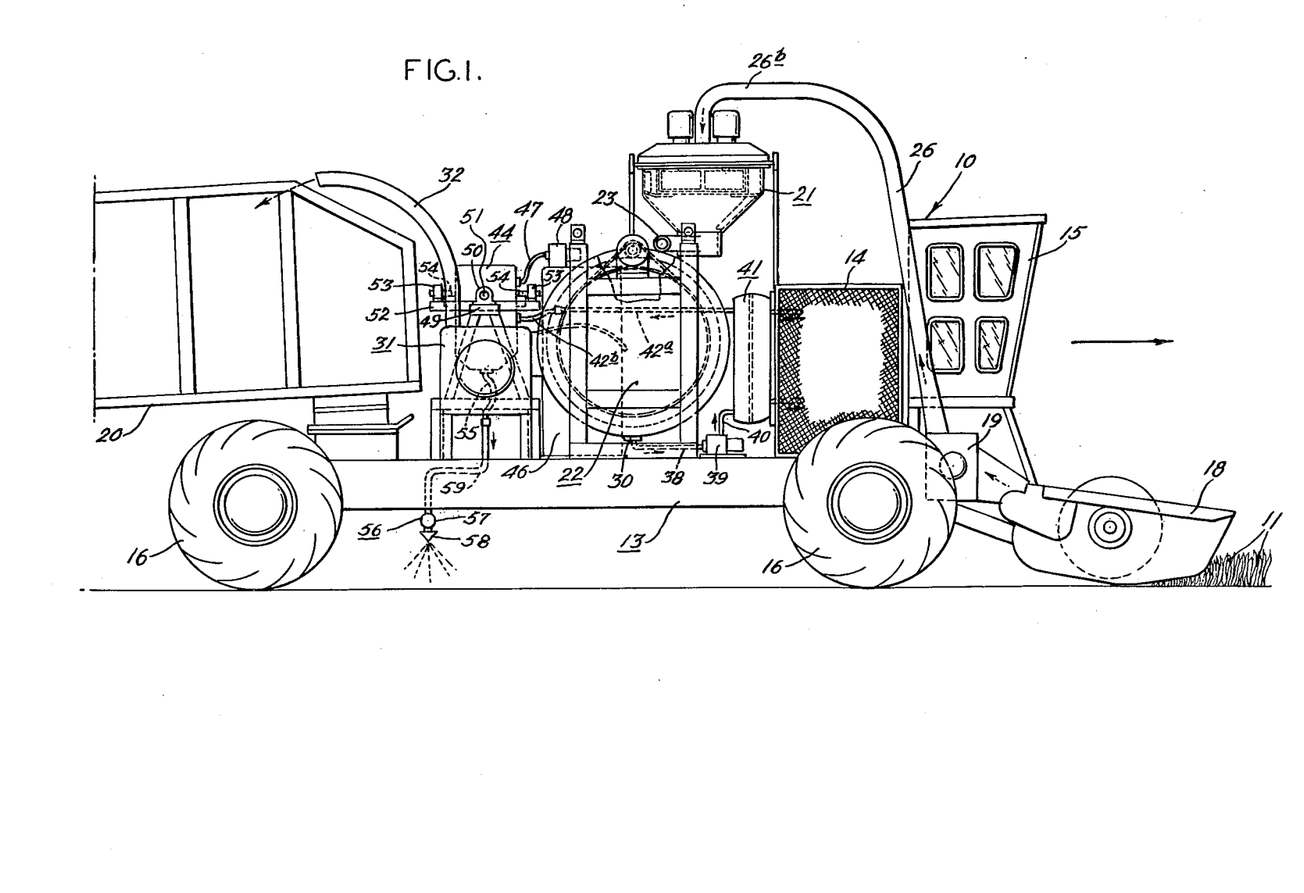
FIG. 1 is a side elevation view of apparatus which is particularly suited for practicing the method of the present invention.

Referring now to the drawings, FIG. 1 illustrate apparatus 10 which is particularly suited for harvesting and field-processing green plant vegetation including legumes such as alfalfa 11 but which may be used to harvest other green plant forage crops such as timothy, clover, and mixtures of these and other plants commonly called hay. The apparatus 10 comprises a conventional self-propelled vehicle 13 having an engine which is housed in an enclosure 14 and which supplies power through a suitable transmission to drive high-flotation front and rear wheels 16,16. The wheels 16,16 are steered by an articulated steering system controlled from a driver's compartment 15 located on the front of the vehicle 13. A crop-harvesting header 18 is mounted on the front of the vehicle for cutting the alfalfa 11 as the vehicle 13 advances in the direction indicated by the arrow in FIG. 1.

A typical vehicle having a structure similar to the above is manufactured by Champion Products, Inc., of Eden Prairie, Minn. and is sold under its model designation "4-×-4 Articulated."

As best seen in FIG. 1, the header 18 extends transversely across the front of the vehicle 13. The header 18 is designed to cut and convey the alfalfa 11 to a blower-chopper 19 located on the vehicle 13 behind the header 18 and alongside the driver's compartment 15. The blower-chopper 19 functions to convey the alfalfa rearwardly away from the header 18.

In the conventional forage-crop harvester, the alfalfa plants harvested by the header 18 are blown directly into a trailer 20 towed behind the vehicle 13. Thus, when the standing crop of alfalfa 11 has a high moisture content, such as after a rain, the alfalfa collected in the trailer 20 contains a significant amount of water. Heretofore, it was necessary to transport the relatively-heavy, bulky, moisture-laden alfalfa to the dehydrating plant where a substantial amount of thermal energy was required to evaporate the water from the alfalfa.

In accordance with the present invention, the apparatus 10 harvests and field processes alfalfa to minimize the energy required to haul the alfalfa and to dehydrate the same. Specifically, the apparatus 10 is designed to separate from the harvested alfalfa plants a significant amount of the water contained therein and simultaneously to apply the water (which contains chemical compounds valuable as plant fertilizers) directly onto the field.

These advantages are realized by the method of the present invention which comprises the steps of: advancing the mobile harvesting apparatus through a standing crop of alfalfa, harvesting the alfalfa with the apparatus as it advances, separating the harvested alfalfa into a fibrous fraction and a liquid fraction, fractionating the liquid fraction into a first component which has a protein value and a second component which has a fertilizer value, collecting the fibrous fraction and the protein value component of the liquid fraction, and applying the fertilizer value component of the liquid fraction onto the field as the apparatus advances. Thus, the fibrous fraction of the harvested alfalfa is lighter in weight and packs more densely so that it is less expensive to transport; the alfalfa fiber can be dehydrated with less energy; and the liquid fraction by-product is discarded on the field in an economically and environmentally satisfactory manner.

The separating step is performed in a specially-designed rotary extruder or macerator 21 which shreds the harvested alfalfa and a dewatering press 22 which presses the macerated alfalfa to separate the same into a fibrous fraction and a liquid fraction.

Figure 2:
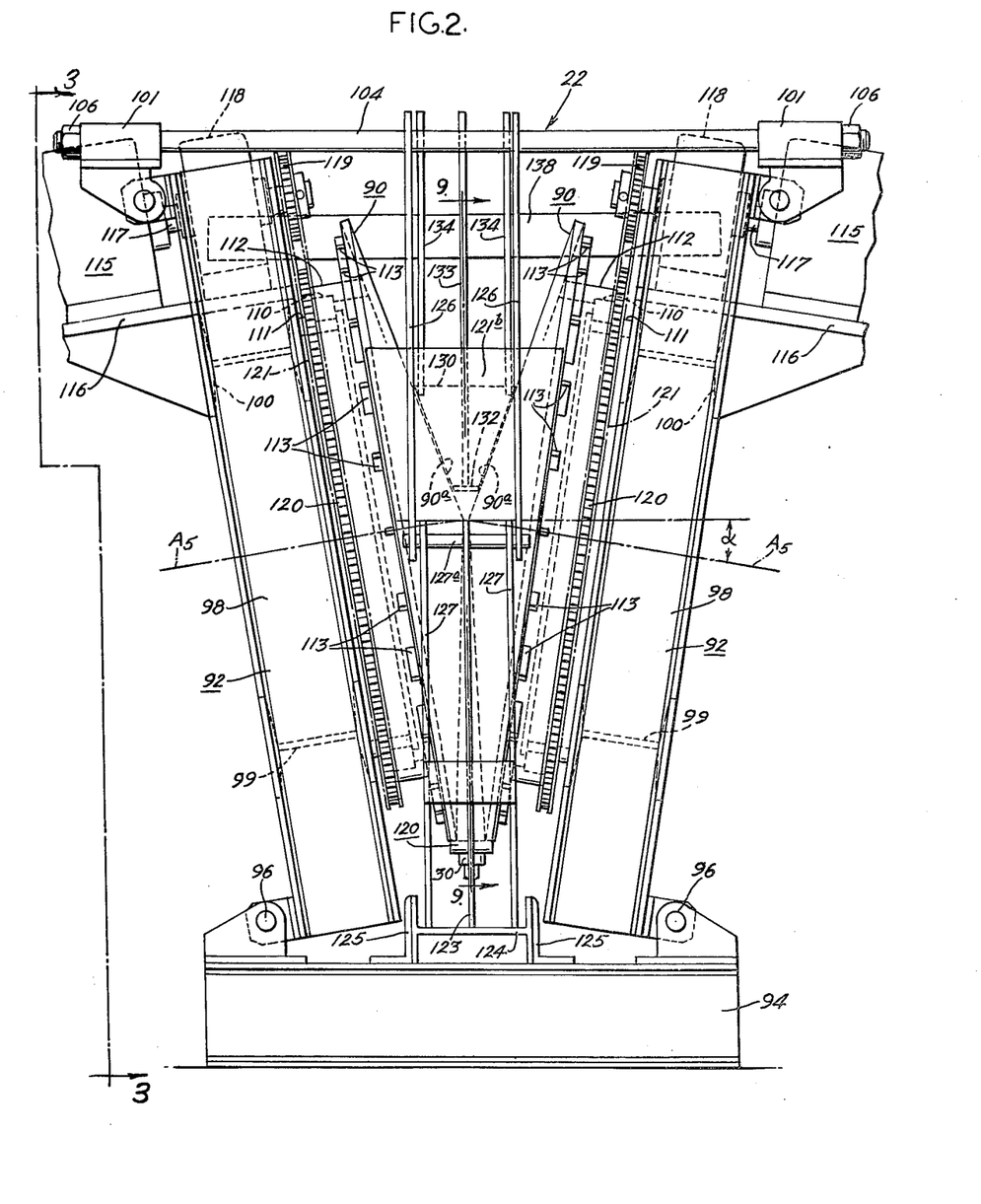
FIG. 2 is a front elevational view of a dewatering press particularly suited for use in separating macerated plant material into liquid and fibrous fractions.

As best seen in FIG. 1, the macerator 21 is carried by the vehicle 13 at an elevated level behind the driver's compartment 15. The harvested alfalfa is supplied to the macerator 21 through a tube or conduit 26 which is connected to the blower-chopper 19. As best seen in FIG. 2, the tube 26 has diverging leg portions 26a and 26b which turn downwardly into the top of the macerator 21 to provide means for distributing the alfalfa at diametrical locations in the macerator 21.

The macerated alfalfa emerges from the bottom of the macerator 21 and enters a hydraulically-powered screw conveyor or auger 23 which conveys the macerated alfalfa to the dewatering press 22 located on the side of the vehicle 13 opposite the macerator 21.

The dewatering press 22 has an inlet at its upper end for receiving the macerated alfalfa supplied by the conveyor 23. The alfalfa advances clockwise in the press and is squeezed therein. Liquid expressed from the alfalfa is collected in a drain 30 at the bottom of the press 22. The pressed alfalfa fiber is expelled from the press 22 and into a blower 31 mounted behind the press 22. An upwardly and rearwardly curved chute 32 is connected to the outlet of the blower 31 to direct the pressed fiber rearwardly into the trailer 20 for collection therein.

The structure and operation of both the macerator and the dewatering press will be described more fully hereinafter. It is sufficient to note at this juncture that the macerator functions to rupture the cells of the leaves and stalks of the alfalfa plant by extruding them through shaped orifices. The dewatering press functions to separate the alfalfa plants into liquid and fibrous fractions by applying relatively high pressures to the macerated plants for a sufficient period of time to allow the liquid to flow by gravity from the plants.

The liquid fraction collected at the bottom of the dewatering press 22 is separated into a first liquid component having a protein value and a deproteinized second liquid component having a fertilizer value. To this end, the drain 30 of the press 22 is connected by a conduit 38 to a pump 39 which is connected by a conduit 40 to a heat-exchanger 41. The heat exchanger 41 is connected by a conduit 42a and flexible coupling 42b to a holding or fractionating tank 44 located on the rear of the vehicle 13 behind the macerator 21 and alongside the blower 31. The heat exchanger 41 is connected to means on the vehicle 13 for generating a source of heat, such as the hydraulic fluid which drives the various hydraulic motors and actuators employed on the vehicle. If desired, heat may be obtained directly from the cooling system of the engine. The liquid fraction may also be heated by injecting steam into the liquid fraction. The steam may be generated in the cooling system of the engine and supplied, for example, from the engine radiator, with suitable provision being made to carry make-up water on the vehicle.

The heat exchanger 41 and the fractionating tank 44 should have a sufficient capacity to heat about 4500 gpm of the liquid fraction to a temperature of about 80° C. and to maintain the liquid fraction at that temperature for about 2–4 minutes. The heating which occurs in the heat exchanger 41 and the holding which occurs in the fractionating tank 44 causes the proteins contained in the liquid fraction to coagulate. The coagulated proteins form a bright green curd having the texture of cottage cheese. Because of its low density, the curd rises to the surface of the liquid or whey contained in the fractionating tank, and this permits the curd to be separated from the underlying liquid by conventional skimmers in the tank 44. If desired, a centrifugal separator may be utilized satisfactorily.

After separation from the whey, the curd is fed into a storage container 46 through a flexible coupling 47. Preferably, the storage container 46 is maintained under a slight vacuum by a pump 48 to draw the curd from the fractionating tank 44.

To facilitate separation of the curd from the whey, it is desirable to maintain the liquid fraction relatively quiescent in the fractionating or holding tank 44. To this end, the fractionating tank or vessel 44 is mounted to the vehicle 13 by gimbal means which enables the fractionating tank 44 to pivot about horizontal axes extending both longitudinally and transversely with respect to the path of movement of the vehicle 13. As best seen in FIG. 1, the illustrated gimbal mounting means includes a pair of upstanding A-frame members 49,49 which mount bearings 50,50 at their upper ends. The bearings 50,50 rotatably receive trunnions 51,51 which extend transversely outward from a rectangular frame 52. The frame 52 mounts a pair of bearings 53,53 which receive trunnions 54,54 extending longitudinally outward from the fractionating tank 44. With this structure, the fractionating tank 44 is capable of pivoting about intersecting horizontal axes provided by the trunnions 51 and 54 in response to pitch and roll motion of the vehicle 13. As a result, the liquid contained in the fractionating tank 44 is maintained substantially level as the vehicle 13 advances, thereby facilitating gravitational separation of the curd from the whey.

The residual liquid fraction or whey contained in the fractionating tank 44 includes chemical compounds which are known to promote plant growth. For example, standing alfalfa containing 80% moisture and 20% protein can yield a whey consisting of 94% water and 6% dry matter, by weight. The dry matter is composed of chemical compounds of the elements nitrogen, phosphorous, potassium, and other growth-promoting trace element compounds. As used herein, the term fertilizer value refers to these chemical compounds.

The deproteinized liquid or whey is applied onto the field as the alfalfa is being harvested and processed. For this purpose, applicator means is provided on the vehicle 13 for spreading the whey on the field. In the illustrated embodiment, the whey is applied by a sprayer assembly 56 which is mounted beneath the vehicle 13. As best seen in FIG. 2, the sprayer assembly 56 comprises an elongated manifold 57 and a series of spray heads 58,58 depending from the manifold 57 in spaced relation therealong. The manifold 57 is connected to the bottom of the fractionating tank 44 by a conduit 59 and a flexible coupling 55. Although the whey will flow by gravity from the fractionating tank 44 to the spray heads 58,58, it may be desirable to install a pump in the conduit 59 between the tank 44 and the manifold 57 to increase the spraying pressure at the spray heads 58. In the present gravity flow system, the manifold 56 has a length which is substantially coextensive with the width of the harvesting header 18 so that the whey is spread substantially uniformly across the width of the swath cut by the harvesting head 18.

The macerated plant matter is separated into liquid and fibrous fractions in the dewatering press 22 which causes a continuous pressure to be applied to the macerated plant matter for a sufficient period of time to enable the liquid fraction to flow by gravity from the fibrous fraction. To this end, the dewatering press 22 comprises a pair of conically-shaped pressure members or plates 90,90 and frame means 92 mounting the pressure plates 90,90 for rotation about their central axes $A_5, A_5$. As best seen in FIG. 7, the pressure plates 90,90 are disposed with their apexes 90a,90a in closely-spaced confronting relation and their axes $A_5, A_5$ intersecting one another at an obtuse downwardly-subtended included angle of about 150°, forming angles α of about 15° with respect to the horizontal. This causes the confronting working surfaces of the pressure members 90,90 to diverge above the apexes 90a,90a for receiving plant matter and to converge below the apexes 90a,90a for pressing the plant matter. For instance, the surfaces have a maximum divergence at the twelve o'clock position and a maximum convergence at the 6 o'clock position. When the pressure plates 90,90 are rotated clockwise (FIG. 3) about their axes, increasing pressure is applied to the plant matter as it advances from the 12 o'clock to the 6 o'clock position. By way of example, the pressure member 90 has an outside diameter of about 5 ft. and an axial height of about ½ ft. and provides a volumetric compression ratio of about 4:1.

Figure 3:
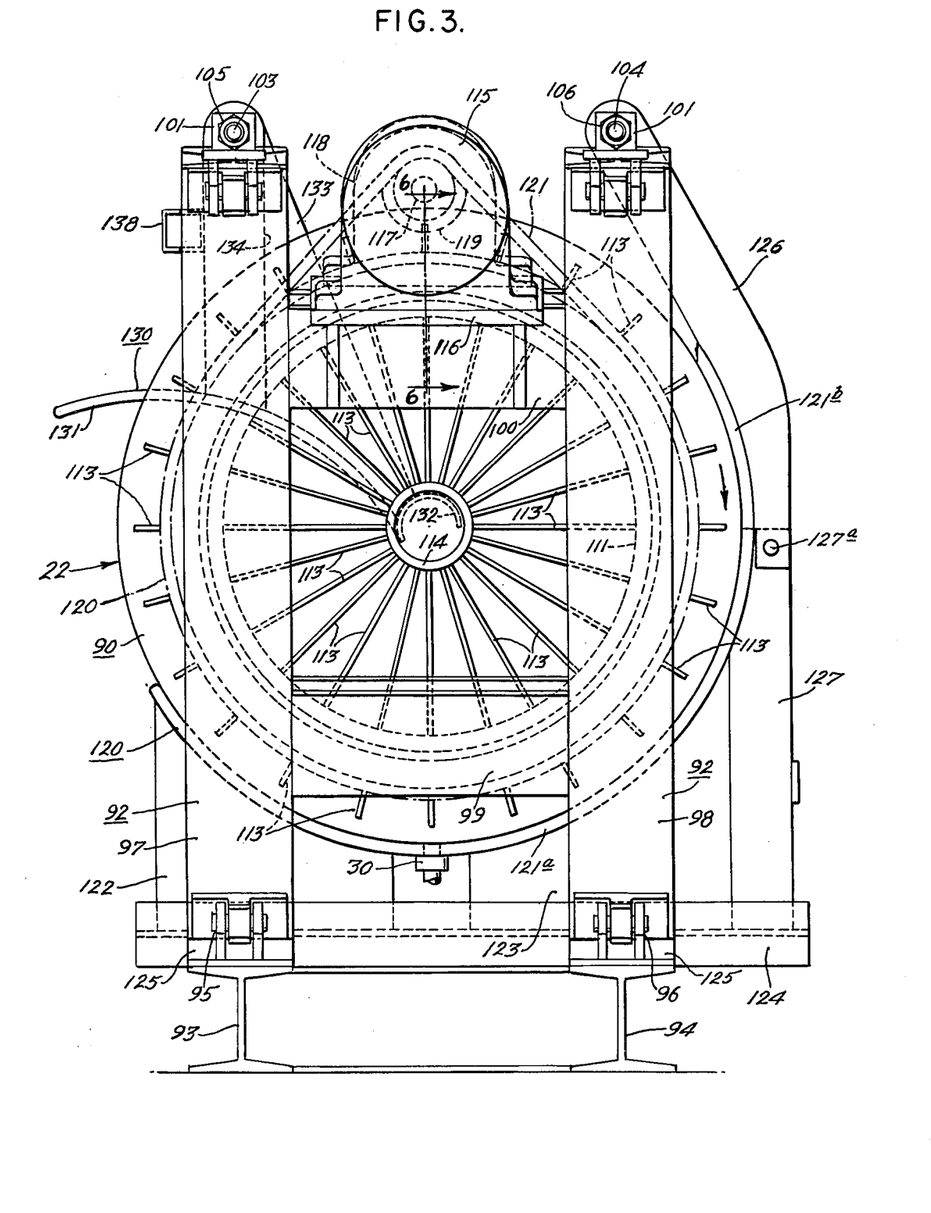
FIG. 3 is a side elevational view of the dewatering press taken on line 3—3 of FIG. 2.

The pressure plates 90,90 can be separated readily for cleaning and maintenance purposes. To this end, the frame means mounts the pressure members 90,90 in a manner affording pivotal separation thereof. As best seen in FIG. 3, the frame means 92 comprises a pair of base beams 93 and 94 which extend in spaced parallel relation beneath the pressure members 90,90. The base beams 93 and 94 mount hinge assemblies 95 and 96, respectively, on their upper flanges, and the hinge assemblies 95 and 96 mount a pair of upstanding struts or beams 97 and 98. The struts 97 and 98 are connected together by lower and upper braces 99 and 100, respectively. The upper ends of the beams 97 and 98 pivotally mount journal blocks 101 and 102 which receive tie rods 103 and 104, respectively, which extend across the top of the pressure members 90,90. Opposite ends of each rod 103 and 104 are threaded and receive nuts 105 and 106 which engage the outsides of the journal blocks 101 and 102. The tie rods 103 and 104 function to resist the forces applied axially in opposite directions against the pressure members 90,90 as they squeeze the plant matter. The tie rods 103 and 104 releasably connect the pressure members 90,90 in their operating relation to enable them to be pivoted downwardly about their hinges 95 and 96 to afford access to the inside of the dewatering press 22 for cleaning and maintenance. Also, the tie rods 103 and 104 afford a slight adjustment of the spacing between the confronting surfaces of the pressure members 90,90 to enable the capacity of the press to be increased for those applications where less than maximum pressing pressures are needed.

As the plant matter is squeezed between the pressure members 90,90, substantial reaction forces are applied to the pressure members 90,90 as they rotate about their axes. In order to counteract the reaction forces, a thrust bearing 110 is provided between each pressure member 90 and its supporting strut assembly 97–100, and means is provided to mount the thrust bearing 110 therebetween. As best seen in FIG. 11, the thrust bearing mounting means includes an annular ring 111 which extends inwardly from the strut assembly 97–100 and which has an outer annular groove mounting the inner ring 110a of the thrust bearing 110. A larger diameter annular flange 112 extends outwardly from the rear of the pressure member 90 and has an inwardly-facing peripheral groove which receives the outer ring 110b of the thrust bearing 110. Each pressure member 90 is reinforced by a plurality of radially extending reinforcing ribs 113,113 which extend outwardly from a central hub 114 on the outside of the pressure member 90 and beyond the annular flange 112 to terminate adjacent the outer periphery of the pressure member 90. With this structure, each pressure member 90 is relatively lightweight yet rigid and is capable of rotating with a minimum of friction even when substantial pressures are applied.

For the purpose of rotating the pressure members 90,90 each pressure member 90 is provided with independent drive means. In the present instance, as best seen in FIGS. 2 and 3, the rotating means for each pressure member 90 includes an hydraulic motor 115 mounted on a ledge 116 which extends outwardly from the upper brace 100 of the strut assembly. The motor 115 has a shaft 117 which extends through a pillow block 118 mounted on the ledge 116, and a small sprocket or rotor 119 is mounted on the end of the motor shaft 117. As best seen in FIG. 11, a large sprocket or drive member 120 is welded to the outside edge of the pressure member flange 112. A drive chain 121 engages the sprockets 119 and 120 so that rotation of the hydraulic motor 115 causes the pressure member 90 to rotate about its axis $A_5$. Preferably, the motor 115 is of 15 hp and rotates at 30 rpm to rotate the pressure member 90 at a speed of about 1.0 rpm, thereby providing a pressing capacity of 60,000 lbs/hr of macerated plant matter. Since the pressure members 90,90 rotate at relatively slow speeds, it is not necessary for their rotational speeds to be synchronized in order to obtain a satisfactory pressing action. It is believed that the lack of synchronization actually causes the plant matter to be stirred slightly to improve the pressing action.

Figure 4:
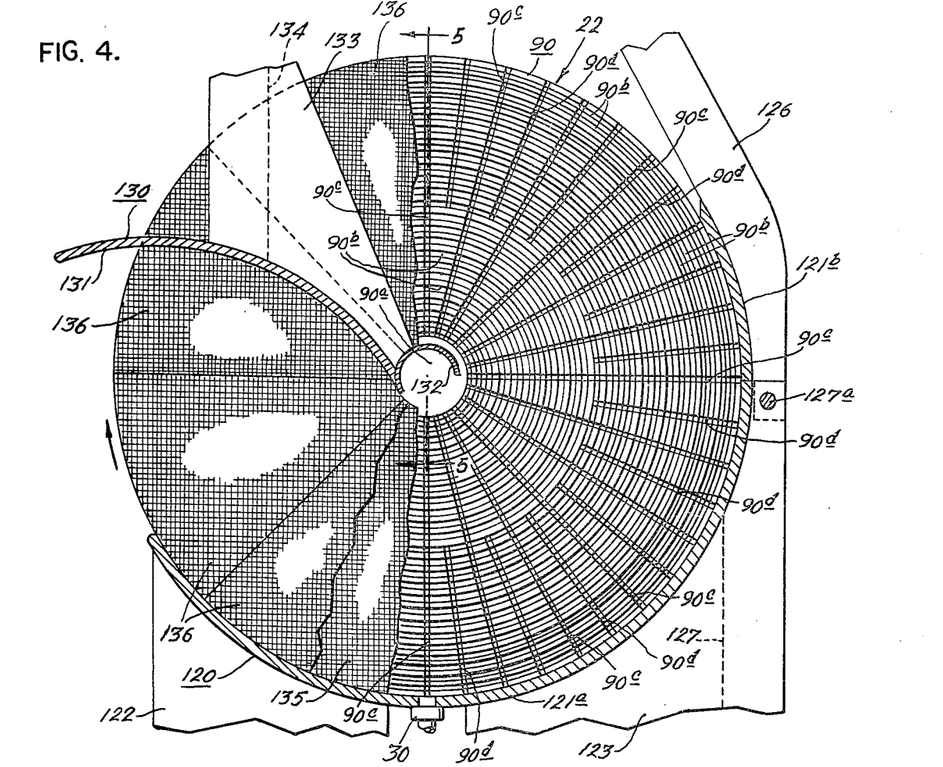
FIG. 4 is a sectional view of the dewatering press taken on line 4—4 of FIG. 2.
Figure 5:
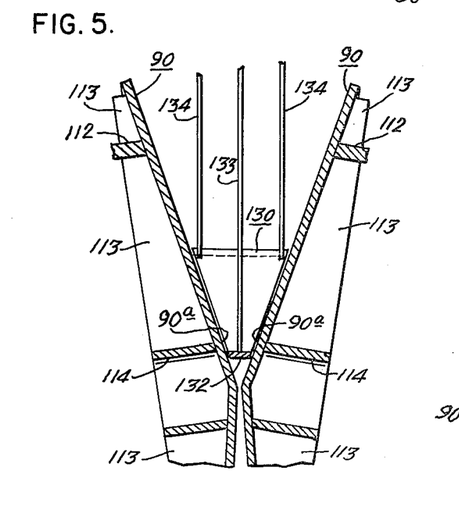
FIG. 5 is a fragmentary sectional view taken on line 5—5 of FIG. 4.
Figure 6:
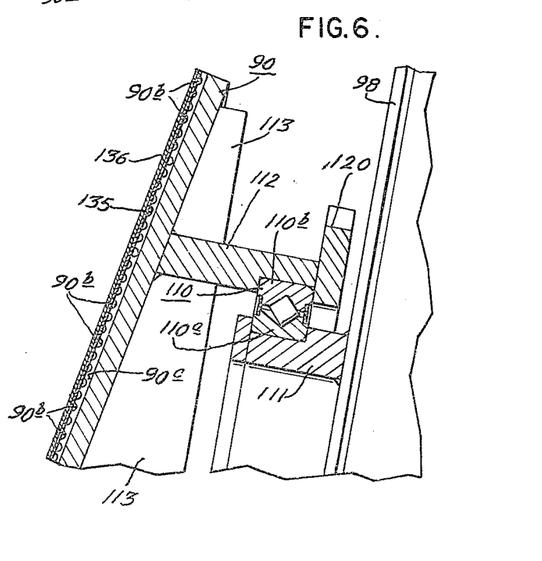
FIG. 6 is a greatly-enlarged sectional view taken on line 6—6 of FIG. 3.

The liquid fraction expressed from the fibrous fraction when the pressure members 90,90 are rotated in the clockwise direction (FIG. 3) flows by gravity toward the drain 30 in the bottom of the dewatering press 22. In order to collect the liquid fraction and to channel the same to the drain 30, pan means 120 is provided. As best seen in FIG. 4, the pan means includes a hardened steel pan plate having a lower portion 121a which extends along the lower periphery of the pressure member 90 from about the 8 o'clock position to about the 3 o'clock position across the lower edges of the pressure member 90 in close proximity therewith to resist leakage therebetween. The lower portion of the pan plate 121a is supported by a pair of aligned upstanding gusset plates 122 and 123 which are welded onto an I beam 124 mounted between angles 125,125 secured transversely across the tops of the base beams 93 and 94. The pan plate also has an upper portion 121b which extends similarly from the 3 o'clock position to about the 2 o'clock position. The upper portion 121b of the pan plate is mounted to a pair of arms 126,126 which are pivotally mounted at their upper ends to the tie bar 104 and which depend therefrom in spaced parallel relation. The lower ends of the arms 126,126 receive the upper ends of stanchions 127,127 which project upwardly from the I beam 124. A pin 127a extends through the arms 126 and 127 and releasably connects them together to maintain the upper portion of the pan plate 121b in operative relation against the outer periphery of the pressure members 90,90.

The fibrous fraction is expelled continuously from between the pressure members 90,90 as they rotate. To this end, deflector means 130 is provided between the confronting surfaces of the pressure members 90,90 at the rear of the dewatering press 22. As best seen in FIG. 4, the deflector means 130 comprises a concave vane plate 131 which extends outwardly and upwardly from an arcuately-shaped wall 132 located closely adjacent the apexes 90a,90a of the pressure members 90,90. A triangularly-shaped gusset plate 133 projects upwardly from the upper surface of the vane plate 131 and wall 132 and is pivotally mounted on the rear tie rod 103. As best seen in FIG. 10, the deflector vane 131 and wall 132 are sized to span across the gap between the confronting surfaces of the pressure members 90,90. A pair of arms 134,134 extend vertically upward from the upper surface of the vane plate 131 and are pivotally mounted to the tie rod 103 to resist forces applied vertically by the fibrous fraction as the pressure members 90,90 rotate and the fibrous fraction is deflected outwardly from the rear of the dewatering press 22. The gusset plate 133 cooperates with the upper surface of the deflector vane 131 and wall 132 to channel the incoming plant matter toward the right of the rotational axes of the pressure members 90,90 when it is charged downwardly into the top of the dewatering press 22. A hollow elongated member 135 mounts transversely across the arms 134,134 and the gusset plate 138 and engages across the rear beams 97,97 to prevent the deflector plate 131 from pivoting about the tie rod 103.

The pressure members 90,90 are designed to enable the liquid fraction to flow freely by gravity into the pan means 120. For this purpose, channel and screen means is provided on each pressure member 90 to cause the liquid fraction to flow in the desired direction. As best seen in FIG. 4, the channel means includes a series of concentric circular grooves 90b,90b spaced apart on the inner or working surface of the pressure member 90. The circular grooves 90b,90b are intersected at spaced intervals by deeper channels 90c,90c each of which extends radially outward from a location adjacent the apex 90a of the pressure member 90. Shorter similar channels 90d,90d extend radially outward intermediate adjacent longer channels 90c,90c. All of the channels 90c and 90d extend to the outer periphery of the pressure member 90. Thus, liquid can flow in the circular grooves 90b,90b to the channels 90c or 90d whereupon it flows downward by gravity into the drain 30 in the pan means 120. As a result, the imperforate pressure members eliminate the need for additional means to collect the expressed liquid.

To prevent the grooves and channels in each pressure member 90 from becoming clogged with vegetation during operation of the dewatering press 22, screen means is provided to cover the working surface of each pressure member 90. As best seen in FIG. 4, the screen means includes a series of segments 135 of a lower or inner screen or perforated support plate removably mounted against the working surface of each pressure member 90 by suitable fasteners (not shown). Another series of screen segments 136 are superimposed over the lower screen segments 135 and are removably fastened in a similar manner to each pressure member 90. Preferably, the support screen 135 adjacent the pressure member 90 is thicker than the outer screen 136 to prevent its being forced into the grooves and channels. The outer screen 136 functions to prevent small particles of the vegetation from being forced into the holes in the support screen 135 and then the grooves 90b and the channels 90c and 90d and interfering with the free flow of fluid therein. Of course, the screens 135 and 136 are capable of being removed readily for periodic cleaning. The particular size of the mesh of the screens will depend on the type of material being pressed. The outer screen 136, however, must be sufficiently fine as to keep the plant fiber on its surface.

In operation, the motors 115,115 cause the pressure members 90,90 to rotate in the direction indicated by the arrow in FIG. 4. The plant matter to be pressed is fed downwardly into the space between the pressure member 90,90 to the right of their apexes, and the plant matter is gradually pressed between the 12 and 6 o'clock position as the pressure members 90,90 rotate. The liquid expressed from the plant matter flows in the grooves and channels in the pressure members and into the pan means 120 before entering the pan drain 30. The pressed plant fiber continues to advance in the clockwise direction toward the 9 o'clock position until it contacts the deflector vane 131 and is expelled outwardly from between the pressure members 90,90.

The dewatering press 22 is designed to separate approximately 60,000 lbs/hr. of alfalfa into fibrous and liquid fractions. Inlet and outlet conduits are provided to feed and remove the plant matter; however, they have been omitted from the drawings to simplify the illustrations.

The apparatus of the present invention enables substantial fuel savings to be realized in the dehydration of alfalfa. For instance, it is estimated that up to 50% of the fuel presently needed to dehydrate a given quantity of alfalfa can be saved. Also, since more alfalfa fiber can be carried in a vehicle of a given volumetric capacity, fewer trips from field to plant are necessary. This results in an additional saving of fuel and labor.

While a preferred embodiment of a dewatering press has been disclosed in detail, various modifications, alterations and changes may be made without departing from the spirit and scope of the present invention as defined in the appended claims.

I claim:

1. A dewatering press, comprising:
   a pair of conical pressure members each having an outwardly extending annular flange adjacent its periphery,
   frame means mounting said pressure members in juxtaposition with their conical surfaces confronting one another and their axes intersecting at an obtuse angle, said frame means including base means, a strut assembly projecting upwardly from said base means along the outside of each pressure member, hinge means mounting at least one strut assembly to pivot relative to said base means, and tie rod means extending across the pressure members to releasably connect said strut assemblies together,
   an inwardly extending annular flange on each strut assembly telescoped relative to said conical member annular flange,
   bearing means having inner and outer rings secured to said flanges for mounting said pressure members for rotation about their axes,
   means carried by said frame means to rotate said pressure members, said rotating means including a driven member mounted to the outside of each pressure member adjacent its periphery, a rotor and means for rotating said rotor carried by said strut assembly, and means connecting said rotor and said driven member for rotating said pressure member in response to rotation of said rotor and moveable with said strut assembly about said hinge means,
   deflector means interposed between said pressure members for engaging material pressed therebetween and expelling the material as the pressure members rotate, and
   pan means extending along a peripheral portion of said pressure members to collect liquid expressed from said material during rotation of said pressure members.

2. A dewatering press according to claim 1 wherein said pan means includes a plate having a lower portion extending along the lower periphery of said pressure members and an upper portion extending along the upper periphery of said pressure members on the side opposite said deflector means, and means carried by said frame means mounting said upper plate portion to pivot away from the periphery of said pressure members.

3. A dewatering press according to claim 1 wherein said frame means includes a pair of rods extending in spaced parallel relation across the tops of said pressure members, and said upper pan plate portion means includes arm means depending from one tie rod and mounting said upper pan plate, stanchion means projecting from said frame means, and pin means extending through said arm means and said stanchion means to effect a releasable connection therebetween.

4. A dewatering press according to claim 1 wherein said deflector means includes a downwardly concave plate extending outwardly between said pressure members from a location adjacent their axes, said frame means includes a tie rod mounted above said deflector plate, and said deflector plate mounting means includes a gusset plate connecting said tie rod and deflector plate.

5. A dewatering press according to claim 1 wherein the confronting surface of each pressure member has a series of grooves and an array of radially-extending channels intercepting said grooves for directing liquid flow to the periphery of the pressure member.

6. A dewatering press according to claim 5 including screen means overlying said channels and grooves to prevent fibrous matter from being pressed into the grooves and channels and blocking fluid flow therein.

* * * * *